United States Patent [19]

Sakurai et al.

[11] 3,969,893

[45] July 20, 1976

[54] EXHAUST GAS EMISSION CONTROL DEVICE FOR MULTI-CYLINDER ENGINES

[75] Inventors: Yoshitoshi Sakurai, Kawaski; Takao Okura, Saitama, both of Japan

[73] Assignee: Honda Giken Kogyo Kabushiki Kaisha, Tokyo, Japan

[22] Filed: Oct. 3, 1974

[21] Appl. No.: 511,809

[30] Foreign Application Priority Data

Oct. 15, 1973  Japan.............................. 48-114763

[52] U.S. Cl.................................. 60/282; 60/323; 123/122 AB; 123/52 MV
[51] Int. Cl.² .................... F01N 3/08; F01N 3/10
[58] Field of Search ............ 60/301, 303, 282, 323; 123/52 MV, 122 AB

[56] References Cited
UNITED STATES PATENTS

| | | | |
|---|---|---|---|
| 1,761,960 | 6/1930 | Armitage ......................... | 60/323 X |
| 2,504,973 | 4/1950 | Gehres.............................. | 60/323 X |
| 2,858,667 | 11/1958 | Reske ................................. | 60/321 |
| 3,043,094 | 7/1962 | Nichols.............................. | 60/323 |
| 3,413,803 | 12/1968 | Rosenlund et al. .............. | 60/282 X |
| 3,817,220 | 6/1974 | Brumm et al..................... | 60/303 X |

Primary Examiner—Charles J. Myhre
Assistant Examiner—William C. Anderson
Attorney, Agent, or Firm—Lyon & Lyon

[57] ABSTRACT

Each cylinder of an internal combustion V-8 piston engine has a main combustion chamber and an auxiliary combustion chamber connected by a torch nozzle restriction. A main exhaust gas reaction chamber is positioned between the two banks of cylinders. Exhaust passages supply hot exhaust gases from the cylinders to exhaust gas tubes, each of which receives hot exhaust gases from two adjacent cylinders and projects through an insulated wall of the gas reaction chamber, to discharge into it toward an end wall thereof. A main exhaust pipe extends through a remote end wall at the opposite end of the reaction chamber. An exhaust gas induction member is positioned within the reaction chamber and receives the discharge from two of the exhaust tubes.

6 Claims, 3 Drawing Figures

EXHAUST GAS EMISSION CONTROL DEVICE FOR MULTI-CYLINDER ENGINES

This invention relates to internal combustion piston engines of the type having an auxiliary chamber associated with each main combustion chamber and connected thereto through a torch nozzle restriction. A spark plug associated with each auxiliary combustion chamber ignites a relatively rich mixture therein to project a torch flame through the torch nozzle restriction into the main combustion chamber to burn the relatively lean mixture therein.

This invention relates to improvements over the invention disclosed in the copending application of Sakurai et al Ser. No. 487,998 filed July 12, 1974 and entitled "Exhaust Gas Reaction Chambers for Internal Combustion Engine". That prior application is incorporated herein by reference. The present invention employs an improved reaction chamber for further reduction in unwanted components in the exhaust gas such as unburned hydrocarbons and carbon monoxide.

In conventional exhaust gas emission control devices for internal combustion engines, the reaction chamber is located downstream from the exhaust manifold, that is, downstream from the junction of exhaust gases from all of the cylinders. In such a case, there is necessarily a relatively long distance between the engine cylinders and the reaction chamber, so that the temperature of the exhaust gas lowers significantly before reaching the reaction chamber. This undesirable lowering of the temperature of the exhaust gases is particularly noticeable under engine start-up conditions, when the reaction chamber takes so much time to reach the desired heat intensity that the necessary oxidation reactions to minimize the production of unburned hydrocarbons and carbon monoxide are not carried out to the desired extent.

An important object of this invention is to provide an exhaust gas emission control device for a multi-cylinder internal combustion engine which is free from this disadvantage and which is capable of treating the exhaust gas from each cylinder more uniformly.

Other objects and advantages will appear hereinafter.

Figure 1:
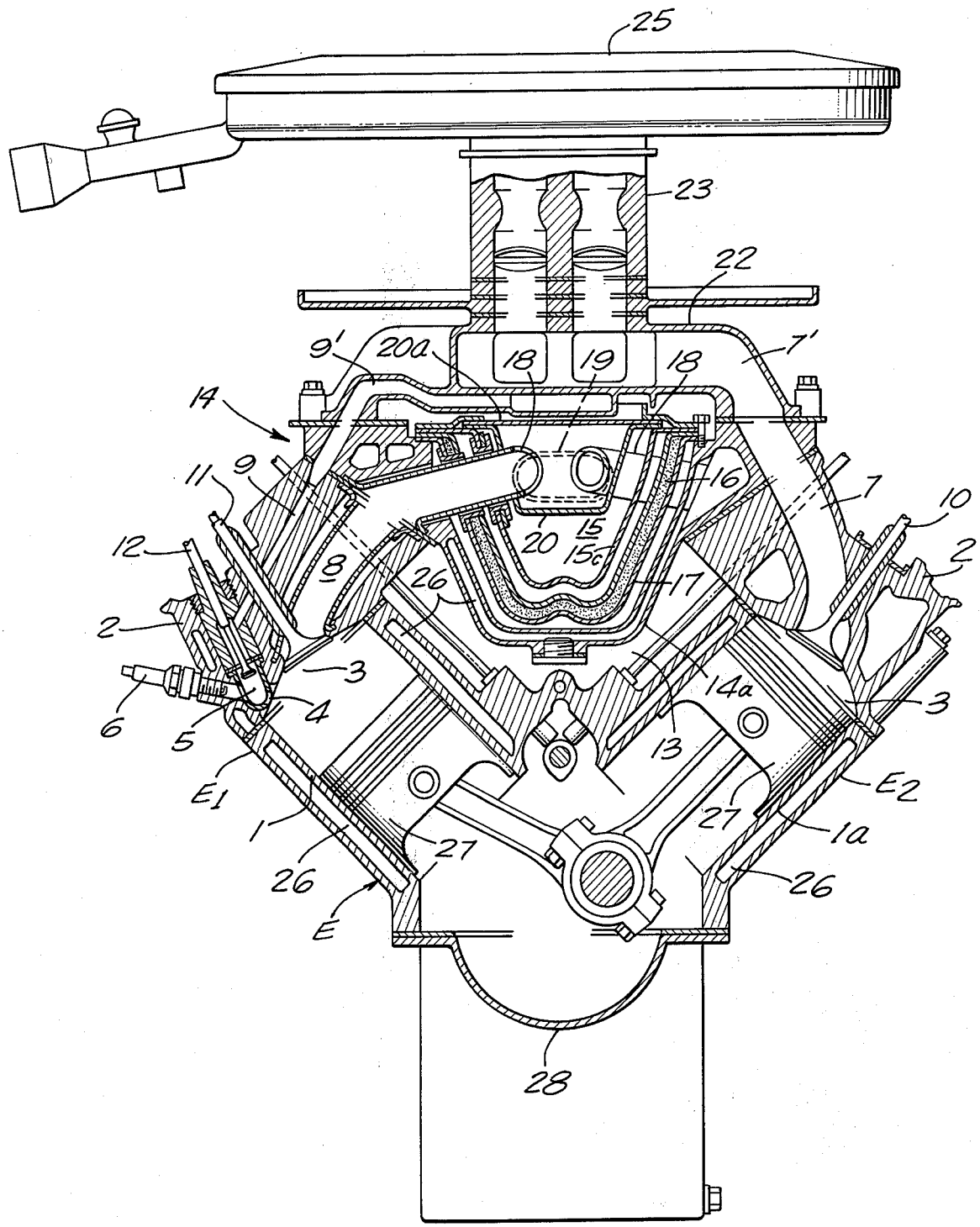
FIG. 1 is a sectional elevation showing a preferred embodiment of this invention.
Figure 2:
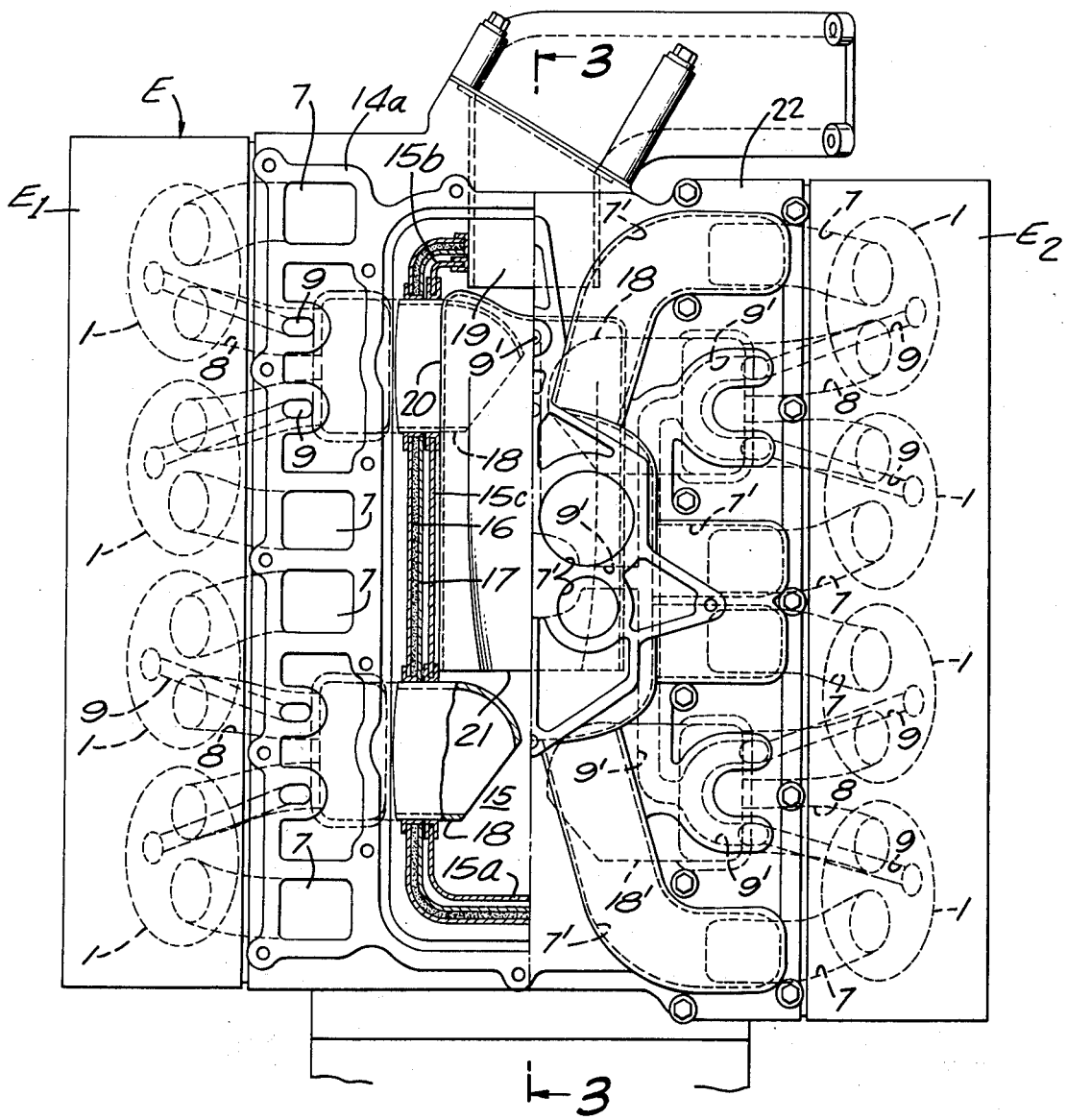
FIG. 2 is a plan view partly broken away.

Referring to the drawings, the V-8 internal combustion engine generally designated E comprises two banks of cylinders 1 and 1a arranged in the shape of the letter V. Each bank of cylinders has a cylinder head 2. Each cylinder has a main combustion chamber 3 and an auxiliary combustion chamber 5 connected thereto by a torch nozzle 4. A spark plug 6 communicates with the auxiliary chamber 5. A main intake passage 7 and an exhaust passage 8 communicate with each main combustion chamber 3. An auxiliary intake passage 9 communicates with the auxiliary combustion chamber 5. The main intake passage 7 is controlled by the main intake valve 10, and the exhaust passage 8 is controlled by the exhaust valve 11. The auxiliary intake valve 12 controls the auxiliary intake passage 9. All of the valves are operated by conventional valve actuating mechanisms.

An exhaust gas reaction device generally designated 14 extends longitudinally within the V-shaped space 13 formed between the engine banks $E_1$ and $E_2$ and contains a reaction chamber 15 defined within the walls of the reactor shell 15c. A heat insulating case 17 surrounds the reactor shell 15c and the space within its double walls may be filled with ceramic and other heat insulating materials 16. Exhaust tubes 18 project through the side walls of the reactor shell 15c and through the side walls of the heat insulating case 17 and through the double wall reactor body 14a. The discharge end of each exhaust tube 18 is directed toward the rear end wall 15a of the reactor shell 15c to require exhaust gases to reverse their direction of movement at the end wall 15a before escaping through the single exhaust pipe 19 extending through the opposite end wall 15b. The inlet end of each exhaust tube 18 is connected to receive exhaust gases from two adjacent exhaust conduits 8 in the cylinder head 2 which have exhaust timings which differ from each other.

An exhaust gas induction member or shroud 20 is positioned within the reaction chamber 15 and the walls of this shroud 20 extend from a location near the exhaust pipe 19 to its open end 21 which is near two of the exhaust tubes 18. The other two exhaust conduits 18 extend into the interior of the shroud 20. The shroud 20 insures that exhaust gases discharged from the tubes 18 near the exhaust pipe 19 travel for a major portion of the length of the reaction chamber 15 before reversing their direction of flow for discharge through the exhaust pipe 19. The construction just described has the beneficial effect of maintaining the exhaust gases at a relatively high temperature for a relatively long period of time before discharge through the exhaust pipe 19 leading to a silencer, not shown.

The reactor body 14a and the reaction chamber 15 are open at the top, but the shroud 20 is closed at the top by its top wall 20a. Both the open tops of the reactor body 14a and the reaction chamber 15 are covered by the intake manifold 22. This intake manifold 22 has main branch passages 7' connecting with and intake passages 7 formed in the engine heads 2. The intake manifold 22 has auxiliary branch passages 9' connected to auxiliary intake passages 9 in the engine heads 2. The passages 7' receive lean mixture from the main compound carburetor 23, and the passages 9' receive rich mixture from the auxiliary single bore carburetor 24.

Air supplied through the air cleaner 25 is delivered to both carburetors 23 and 24. The usual cooling water jackets 26 are provided in the engine block and in the heads 2. The pistons are numbered 27 and the crank case is numbered 28.

In operation, a lean mixture produced in the main carburetor 23 during suction strokes of the engine is distributed through the passages 7' in the intake manifold 22 to the intake passages 7 and is inducted into each main combustion chamber 3, when the intake valves 10 are open. A rich mixture produced in the auxiliary carburetor 24 is distributed through the passages 9' to each auxiliary intake passage 9 and into each auxiliary combustion chamber 5, when the valves 12 are open. At the end of the compression stroke in each cylinder, the mixture in the auxiliary combustion chamber 5 is ignited by a spark plug 6 and the flame passes through the torch nozzle 4 to burn the mixture in the main combustion chamber 3. The excess air in the lean mixture supplied to the main combustion chamber 3 is heated sufficiently to be utilized in the oxidation reaction to burn the unburned hydrocarbons and to convert CO to CO2.

During the exhaust strokes, the exhaust gases from each cylinder are emitted through its respective exhaust passages 8 to one of the exhaust tubes 18 and then into the reaction chamber 15 and directed toward its end wall 15a. Exhaust gases emitted from the two exhaust tubes 18 which are located near the exhaust pipe 19 pass into the shroud 20 and pass out of the shroud through its open end 21. These exhaust gases expand in the reaction chamber 15, reducing their velocity, and after reversing their direction of movement at the end wall 15a flow outside the walls of the shroud 20 to escape through the exhaust pipe 19.

Accordingly, it will be understood that exhaust gases from all of the cylinders enter the reaction chamber 15 located between the two banks of cylinders. The exhaust gases quickly heat the chamber 15, slow down in velocity but with very little temperature drop, flow through the chamber, reversing their direction, so that the exhaust gases remain as long as possible in the reaction chamber. In this way both time and temperature are maintained to improve oxidation and minimize pollutants discharged into the atmosphere.

Figure 3:
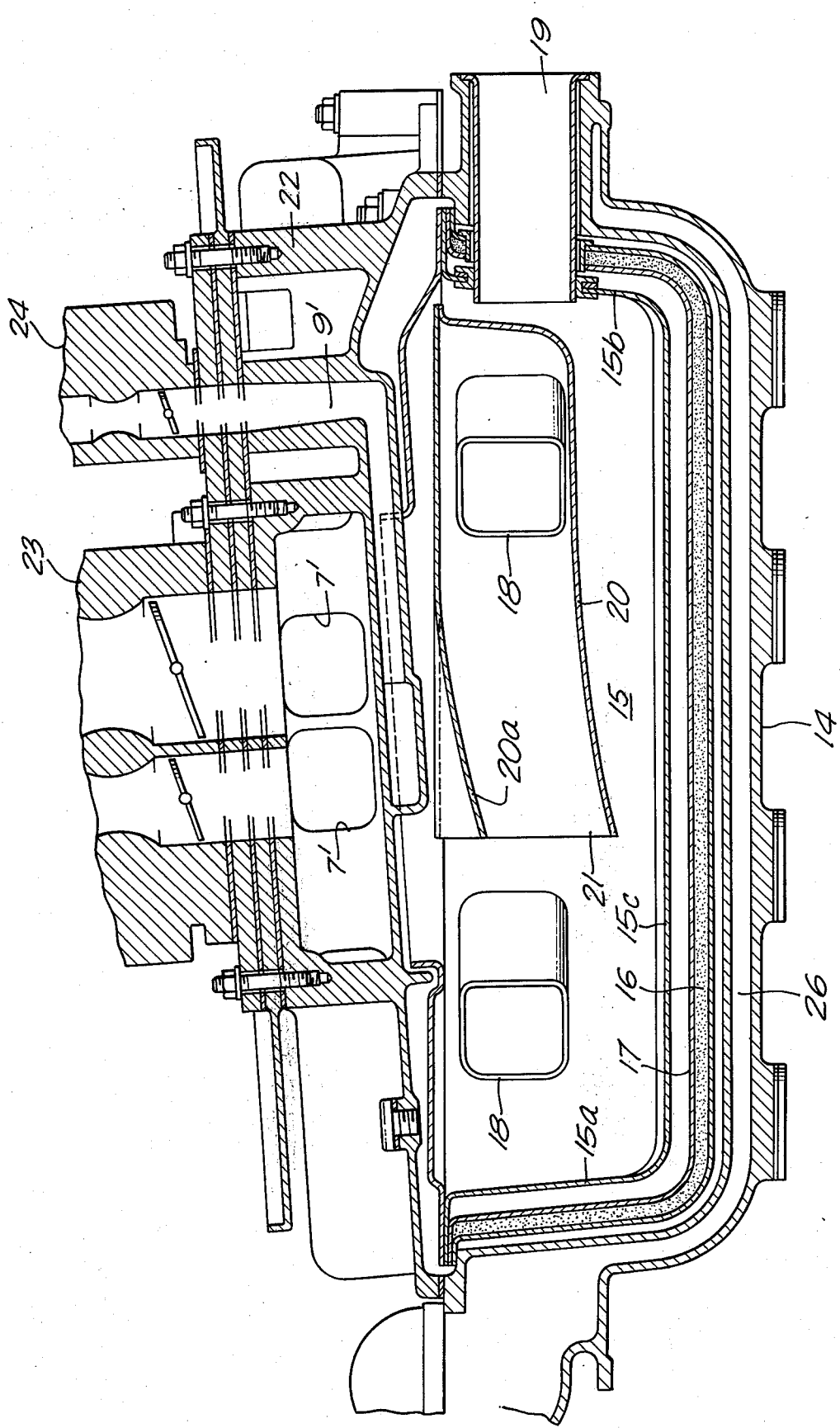
FIG. 3 is a sectional elevation taken substantially on the lines 3—3 as shown in FIG. 2.

The intake manifold 22 that serves as the upper lid of the reaction chamber 15 is heated by the exhaust gases, so that vaporization of lean and rich intake mixtures flowing from the carburetors to the engine is accomplished to minimize the presence of liquid droplets and to improve the combustion in both the main and auxiliary combustion chambers. The exit opening 21 from the shroud 20 is slanted downward, as shown in FIG. 3, so that most of the exhaust gas discharged therefrom turns upward along the end wall 15a of the reaction chamber 15. Accordingly, the amount of exhaust gas flowing along the under side of the intake manifold 22 is increased to insure heating of the intake manifold 22.

From the foregoing description it will be understood that this invention makes it possible to direct exhaust gases from all of the cylinders of a V-shaped multi-cylinder engine into a reaction chamber positioned between the banks of cylinders of the engine, with little drop in gas temperature and to prolong the stay of the exhaust gases in the reaction chamber for maximum oxidation effect. The reaction chamber 15 is heated quickly immediately after starting of the engine in order to cause the exhaust gases to react uniformly and effectively, and thus provide a reduction in the quantity of harmful components contained in the gases discharged into the atmosphere.

Having fully described our invention, it is to be understood that we are not to be limited to the details herein set forth but that our invention is of the full scope of the appended claims.

We claim:
1. In an internal combustion piston engine having cylinders arranged in two banks in a V-shape, each cylinder having an exhaust passage, the combination of: walls forming an exhaust gas reaction chamber positioned between the two banks of cylinders, a plurality of exhaust tubes connected to receive hot exhaust gases from the cylinder exhaust passages and each having a discharge end projecting through said walls, a shroud positioned within the reaction chamber and extending for substantially less than the length of the reaction chamber, said shroud having a discharge opening directed toward an end wall of said reaction chamber, an exhaust pipe associated with an opposite end wall of said reaction chamber, said shroud having a closed end adjacent said exhaust pipe, certain of said exhaust tubes discharging into said shroud and certain of said exhaust tubes discharging into said reaction chamber.

2. The combination set forth in claim 1 in which the engine has eight cylinders arranged in two banks of four and wherein four exhaust tubes each receives exhaust gases discharged from two adjacent cylinders, two of the exhaust tubes discharging into said shroud.

3. The combination set forth in claim 1 in which an intake manifold extends between the two banks of cylinders, and in which the discharge opening of the shroud is slanted away from said intake manifold.

4. The combination set forth in claim 1 in which an intake manifold extends between the two banks of cylinders and forms a closure for the reaction chamber, whereby intake gases in the manifold may be heated.

5. The combination set forth in claim 1 in which each discharge end of the exhaust tubes is directed toward the first said end wall of said chamber.

6. In an internal combustion engine having eight cylinders arranged in two banks in a V-shape, each cylinder having an exhaust passage, the improvement comprising, in combination: walls forming an exhaust gas reaction chamber positioned between the two banks of cylinders, a plurality of exhaust tubes each connected to receive hot exhaust gases from two adjacent exhaust passages of different exhaust timing, each of said exhaust tubes having a discharge end projecting through one of said walls, a shroud positioned within the reaction chamber and extending for substantially less than the length of the reaction chamber, said shroud having a discharge opening directed toward an end wall of said reaction chamber, an exhaust pipe associated with an opposite end wall of said reaction chamber, said shroud having a closed end adjacent said exhaust pipe, two of said exhaust tubes discharging into said shroud and two of said exhaust tubes discharging into said reaction chamber.

\* \* \* \* \*